United States Patent [19]

Marshall et al.

[11] Patent Number: 4,687,093
[45] Date of Patent: Aug. 18, 1987

[54] VIBRATORY FEEDER

[75] Inventors: James W. Marshall, Denton; Michael J. Haaser, Perry Hall; Alex A. Vanicky, Timonium; Gary S. Podhorniak, Baltimore, all of Md.

[73] Assignee: Advanced Manufacturing Systems, Inc., Sparks, Md.

[21] Appl. No.: 670,030

[22] Filed: Nov. 9, 1984

[51] Int. Cl.⁴ ............................................. B65G 37/00
[52] U.S. Cl. ................................ 198/465.2; 198/580; 198/771; 198/795; 250/328
[58] Field of Search ...................... 198/795, 771, 466.1, 198/468.9, 465.1, 465.2, 347; 221/197; 198/752, 755, 759, 580; 901/7; 250/328

[56] References Cited

U.S. PATENT DOCUMENTS

| | | | |
|---|---|---|---|
| 2,479,709 | 8/1949 | Arnold | 198/774 |
| 2,988,237 | 6/1961 | Devol, Jr. | 901/7 X |
| 3,235,056 | 2/1966 | Mouche et al. | 198/465.2 |
| 4,050,572 | 9/1977 | Armstrong | 198/771 X |
| 4,147,250 | 4/1979 | Schulz | 198/465.2 |
| 4,168,775 | 9/1979 | Mueller | 198/795 |
| 4,444,303 | 4/1984 | Burgess, Jr. | 198/771 X |

FOREIGN PATENT DOCUMENTS 727531  4/1980  U.S.S.R. ............................. 198/580

OTHER PUBLICATIONS

EWAB Engineering Inc. brochure.

Primary Examiner—Joseph E. Valenza
Assistant Examiner—Jonathan D. Holmes
Attorney, Agent, or Firm—Leonard Bloom

[57] ABSTRACT

A universal vibratory feeder has a removable tray provided with a continuous serpentine path. A plurality of carriers are received in the path, and articles of manufacture are carried by the carriers around the path in the tray. A vibrating platen beneath the tray has a plurality of bristles engaging the bottom of the respective carriers. The bristles are oriented in the direction of travel of the carriers around the path. The path in the tray is formed by a continuous through opening which separates the tray into two portions. The carriers straddle the thickness of the tray and are in substantial abutting relationship to one another throughout the path, thereby precluding the tray portions from separating.

31 Claims, 17 Drawing Figures

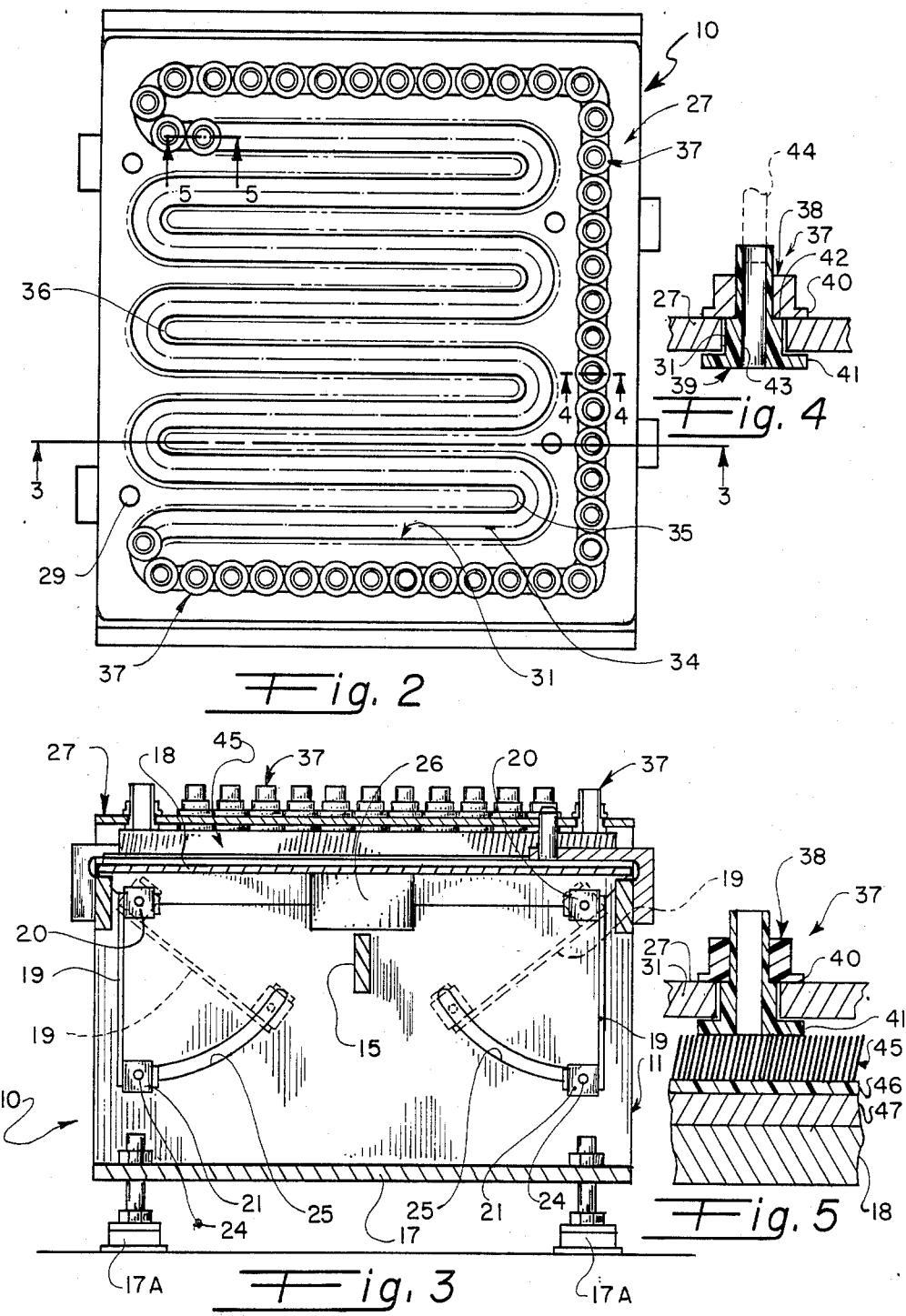

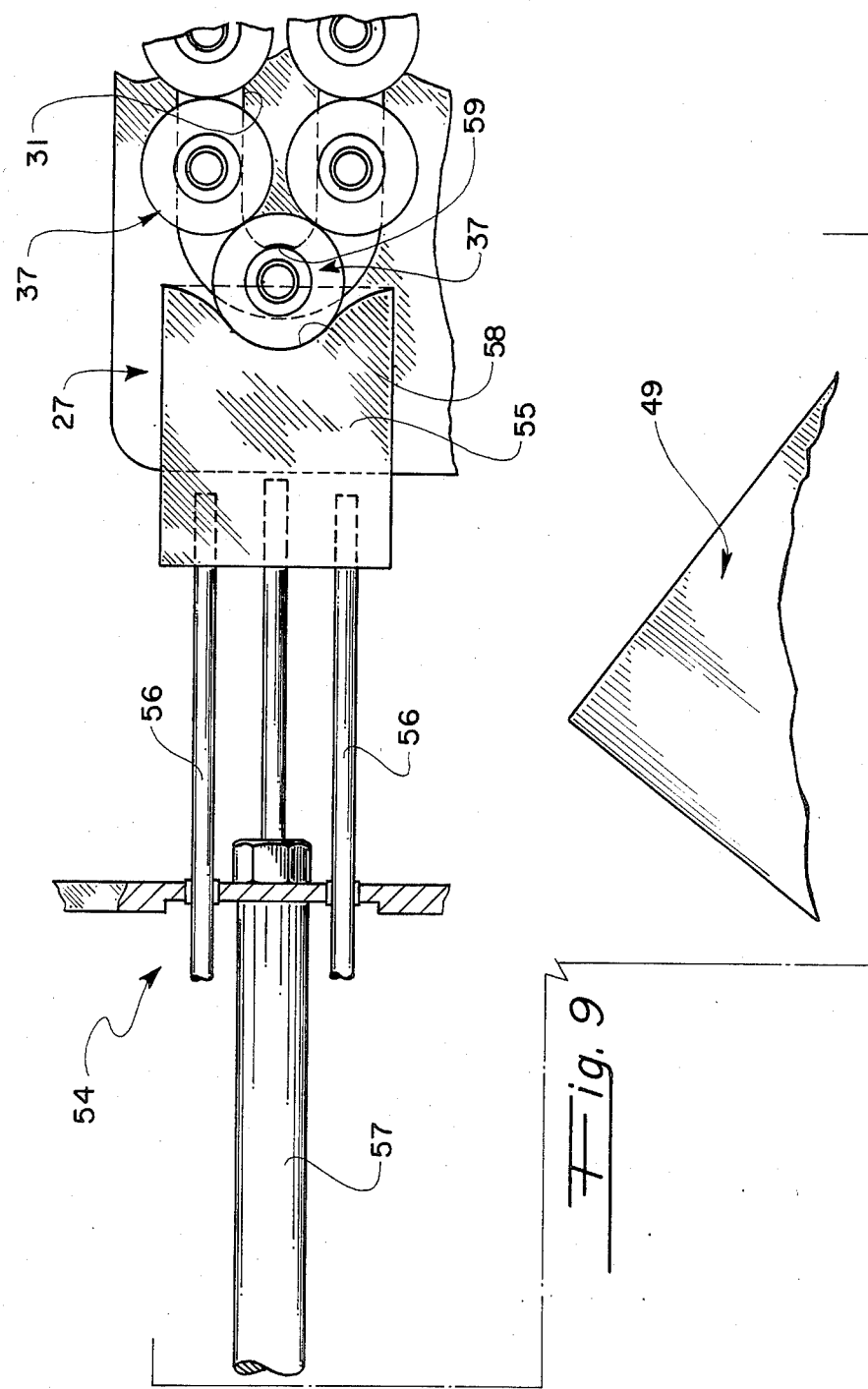

VIBRATORY FEEDER

The present invention relates to a vibratory feeder, and more particularly, to a universal vibratory feeder for various articles of manufacture.

BACKGROUND OF THE INVENTION

Vibratory feeders and related devices are well known in the prior art. These devices are used to feed various components or articles of manufacture, in sequence, to a conventional machine tool or other apparatus within which certain work operations are performed on the articles. For example, these devices may employ a vibrating hopper having a spiral trackway formed on its inner cylindrical or conical surface for progressively feeding the respective articles of manufacture in sequence out of the hopper.

While generally satisfactory for the purposes intended, these prior art vibratory feeding devices are usually relatively large and bulky and hence require a relatively large floor space. Additionally, these devices are somewhat inflexible, that is, they are not readily adaptable to a relatively large number of components and articles having a wide variety of respective sizes, shapes and weights.

In an effort to alleviate the floor space requirements of the vibratory hoppers, various types of vertical stackers have been developed in the prior art. These stackers may employ a substantially vertically-oriented magazine. This magazine may cooperate with a suitable indexing mechanism for selectively removing the articles, in sequence, out of the magazine. While substantially reducing the floor space requirements, these vertical stackers are generally used for relatively-simple identical parts, as for example, a motor armature shaft having a substantially uniform diameter. Shafts having one or more collars or annular shoulders formed thereon are not readily adaptable to these vertical stackers. Accordingly, these vertical stackers are not universally applicable to a wide variety of components or articles of manufacture having varying diameters or irregular configurations.

The use of vibratory strips of relatively stiff bristles has also been used in prior art conveyorized systems. These bristles are oriented away from the vertical and in the direction of desired travel of the articles longitudinally down an elongated conveyor. An improvement to this art is described and claimed in the co-pending Haaser application, Ser. No. 626,774 filed July 2, 1984, and assigned to the assignee of the present invention.

Additionally, the prior art has resorted to a variety of conveyorized feeding trays, wherein the articles of manufacture are positioned in a substantially fixed relationship on the tray. The tray may cooperate with an X-Y type of robotic arm that periodically indexes over the tray to select one of the components and transfer it to a machine tool or other apparatus. Since the positions of the articles on the tray are all different, the robotic arm must sense the respective coodinates of the next desired article to be picked up and transferred. An electronically-controlled sensing means is required, which is fairly complex and sophisticated, relatively expensive, and subject to reliability problems requiring shutdown and repair.

SUMMARY OF THE INVENTION

Accordingly, it is an object of the present invention to provide a vibratory feeder that alleviates the deficiencies and disadvantages of the prior art.

It is another object of the present invention to provide a universal vibratory feeder that is readily adaptable to a wide variety of articles of manufacture.

It is yet another object to provide a vibratory feeder that occupies a minimum of floor space, thereby readily adapting the feeder to a wide variety of machine tools in new or existing factories.

It is a further object to provide a vibratory feeder cooperating with an indexable robotic transfer arm having a single matrix interface, thereby substantially reducing overall tooling costs.

It is a still further object to provide a vibratory feeder apparatus that is relatively simple, capable of high-speed feeding rates, inexpensive to manufacture, and rugged and reliable for extended usage with a minimum of maintenance.

It is a yet still further object to provide in a vibratory or other type of feeder, a unique combination of a tray having a serpentine pathway formed therein and a plurality of carriers moving through the pathway in the tray and arranged to carry respective articles of manufacture thereon.

In accordance with the teachings of the present invention, there is disclosed herein a preferred embodiment of a vibratory feeder for articles of manufacture. The feeder has a platen resiliently mounted on a frame. A tray is removably mounted on the frame above the platen and is spaced therefrom. The tray has a continuous opening formed therein for defining a path through the tray. A plurality of carriers are mounted in the path. The carriers are restrained against substantial vertical movement but have a limited free-floating lateral movement in the plane of the tray. Means are provided for mounting the articles of manufacture on the respective carriers, and means are further provided for vibrating the platen substantially in the plane thereof. Respective bristles are carried on the platen, below the opening in the tray, for engaging the bottom of the carriers. These bristles are oriented away from the vertical and in the direction of desired travel of the carriers through the path in the tray. As the platen is vibrated, the bristles vibrate in unison to continually advance the carriers through the path in the tray.

In accordance with the further teachings of the present invention, the path in the tray is substantially serpentine and includes a plurality of respective portions which are substantially parallel to one another, thereby maximizing the length of the path while substantially minimizing the size of the tray. The bristles are carried by respective strips removably mounted on the platen, and the bristles on alternate strips are tilted oppositely of one another, but always in the direction of travel of the carriers along the path in the tray.

In accordance with the still further teachings of the present invention, the continuous opening (defining the path in the tray) is a through opening which separates the tray into two respective portions having respective fingers that mesh substantially with one another. The carriers are identical and are mounted in the path in the tray in a substantially abutting relationship throughout the path. Each of the carriers has a pair of parallel flanges, preferably circular, which straddle the respective portions of the tray, thereby precluding a separation of the respective tray portions. The carriers may be molded from a suitable plastic material, and each of the carriers includes an upper portion and a lower portion secured together by means of a slight interferance or "snap" fit. In this manner, one of the carrier portions (such as the lower carrier portion) may be readily substituted to accomodate different articles of manufacture. Another feature of the invention is that, while the carriers abut one another, the parts mounted on the respective carriers do not abut one another. Thus a relatively high density part loading may be obtained without risking damage to the parts.

In accordance with the yet still further teachings of the present invention, the means for resiliently mounting the platen on the frame includes at least one pair of springs, preferably substantially flat, and having respective upper and lower ends. The respective upper ends of the springs are mounted to the platen, and the respective lower ends of the springs are mounted to the frame inwardly of the respective upper ends of the springs. The distance between the lower ends of the springs is less than the distance between the upper ends of the springs, such that the springs are not parallel to one another but rather coverage towards one another in a direction away from the platen. With this arrangement, the platen is vibrated along an arc which is slightly convex relative to the tray (concave relative to a bottom wall of the frame) and in which the alternately tilted bristle strips continually advance the article carriers through the path in the tray.

The universal vibratory feeder may constitute an integral part of a conveyorized apparatus for continually feeding articles of manufacture. Means are provided for positioning a "loaded" tray within the frame of the feeder, that is, a tray on which the articles of manufacture have been mounted on the respective carriers. The tray has a predetermined pick-off point, and an indexable robotic transfer arm is provided with gripping fingers for removing the articles of manufacture from the respective carriers, in sequence, at the pick-off point on the tray. This arrangement constitutes a single matrix interface between the feeder and the robotic arm.

A queuing device may cooperate with the robotic arm, in timed sequence, for steadying the respective carrier and hence the article of manufacture at the predetermined pick-off point. After the articles have been removed from the tray, means are provided for removing the "unloaded" tray from the frame. A new loaded tray is inserted into the frame, the cycle is repeated, and the unloaded trays are received in a suitable stacker. This overall apparatus is simple and reliable, flexible and readily adaptable to existing machine tools and various articles of manufacture, and is considerably less expensive to manufacture and to maintain.

These and other objects of the present invention will become apparent from a reading of the following specification taken in conjunction with the enclosed drawings.

BRIEF DESCRIPTION OF THE DRAWINGS

FIG. 2 is a plan view of the vibratory feeder, showing the plurality of carriers for respective articles of manufacture to be mounted thereon.

FIG. 3 is a section view, taken across the lines 3—3 of FIG. 2, showing a preferred means for resiliently mounting the vibratory platen to the frame of the feeder.

FIG. 4 is a detail section view, taken across the lines 4—4 of FIG. 2, drawn to an enlarged scale, and showing the details of construction of a preferred carrier, the bristles on the vibratory platen being omitted for ease of illustration, and a portion of an article of manufacture being shown in broken lines.

FIG. 5 is a further detail section view, taken across the the lines 5—5 of FIG. 2, drawn to an enlarged scale, and showing the manner in which the bristles on the vibratory platen engage the bottom of the carrier.

FIG. 9 is a plan layout of a queuing device cooperating with the carriers and the robotic transfer arm for facilitating the sequential removal of the articles of manufacture.

GENERAL DESCRIPTION OF THE PREFERRED EMBODIMENT

Figure 1:
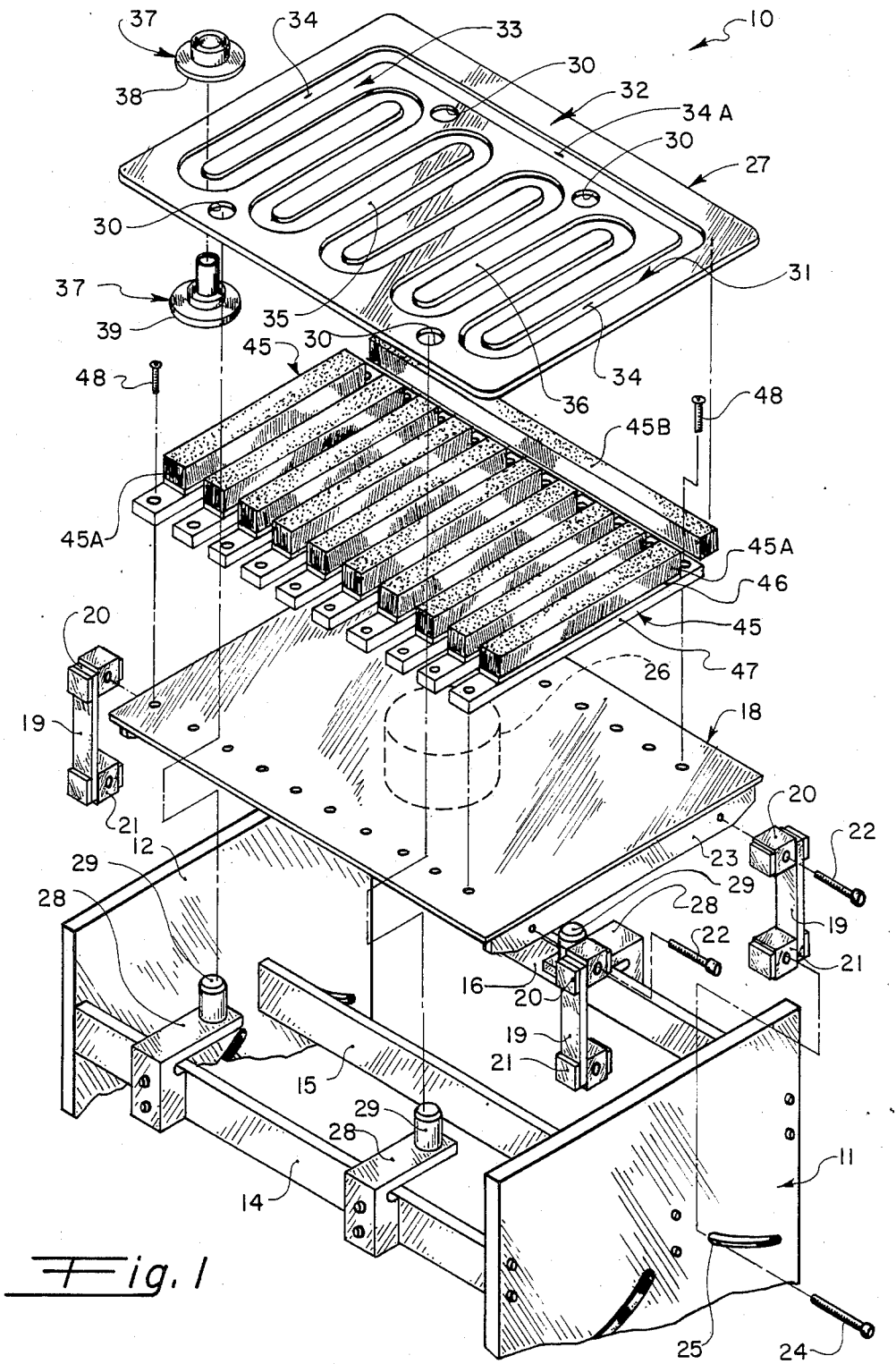
FIG. 1 is an exploded pictorial view of the major components of the vibratory feeder of the present invention, showing the frame, the vibratory platen resiliently mounted on the frame, the bristle strips carried on top of the platen, the removable tray having a serpentine path for the respective carriers, and one of the two-part carriers straddling the tray and arranged to move through the path in the tray.

With reference to FIGS. 1-3, the vibratory feeder 10 of the present invention includes a substantially box-like frame 11. The frame includes parallel side walls 12 and 13 connected together by cross braces 14, 15 and 16. The frame further includes a bottom wall 17 supported by suitable resilient feet 17A, as shown more clearly in FIG. 3. The walls and braces of the frame may be made from metal plates suitably bolted or welded together.

A vibratory platen 18 is resiliently mounted on the frame by means of a plurality of springs 19. Preferably, there are two pairs of springs, disposed in juxtaposition to the respective side walls. The springs are preferably flat members made from a relatively-stiff laminated fiberglass and epoxy resin sheet material. Each of the springs is secured to an upper spring block 20 and a lower spring block 21. Each of the upper spring blocks is secured by bolts 22 (or other fasteners) to a depending flange 23 on the platen. Each of the lower spring blocks is secured to a respective side wall of the frame by bolts 24 (or other fasteners). The bolts 24 pass through an arcuate slot 25 formed in the side wall. The arcuate slots subtend an angle of thirty degrees (30°) in a preferred embodiment. This allows the position of the springs to be varied or adjusted for optimum suitability for the particular configuration of the vibratory platen within the frame. The adjusted position of the springs is indicated by the broken lines in FIG. 3. However, it will be understood that once that angle has been determined for a particular feeder, the arcuate slots may be dispensed with in subsequent production of the feeders. A vibratory motor 26 is mounted on the underside of the platen.

Preferably, this vibratory motor includes an air-operated reciprocating free piston. However, it will be appreciated that other vibratory means, such as an orbital vibrator, may be equally applicable consonant with the teachings of the present invention.

As shown more clearly in FIG. 3, the lower ends of the springs are mounted on the side walls of the frame inwardly of the mounting of the upper ends of the springs on the platen, that is, the distance between the lower ends of the springs is less than the distance between the upper ends of the springs, such that the springs tend to converge towards each other in a direction away from the platen. The springs are relatively stiff and will flex slightly during the operation of the feeder. With this arrangement, the platen will vibrate substantially in its plane, but will reciprocate about a slight arc concave with respect to the bottom wall of the frame.

A tray 27 is removably mounted on the frame above the platen and is spaced therefrom. The cross braces 14 and 16 on the frame carry respective brackets 28, each of which has an upwardly-extending shouldered alinement pin 29. The pins 29 are adapted to be received within corresponding holes 30 on the tray, thereby alining the tray on the frame. The tray is substantially planar and has a continuous through opening 31 formed therein. Preferably, the tray is a plate of suitable metal (such as tool steel) and the opening 31 is milled out of the plate. As a result, the tray has an outer portion 32 and an inner portion 33. In the preferred embodiment, the opening in the tray is substantially serpentine, that is, it winds about itself and has a plurality of substantially parallel portions, one of which is denoted at 34. Accordingly, and as shown more clearly in FIG. 1, the inner and outer portions of the tray have a plurality of substantially parallel fingers 35 and 36, respectively, which mesh relative to each other.

The through opening in the tray defines a continuous path which is serpentine and preferably closed. With this construction, the length of the path is substantially maximized, while the size of the tray (that is, its plan area) is substantially mimimized. The tray is rectangular and, in a preferred embodiment, is square. The square plan layout facilitates automated handling of the tray in mutually-perpendicular directions.

A plurality of "pucks" or carriers 37, one of which is shown in section in FIG. 4, are adapted to travel through the path in the tray. The carriers are in substantially abutting relationship to one another, as shown more clearly in FIG. 2. Each of the carriers has an upper portion 38 and a lower portion 39 secured thereto. These carrier portions 38 and 39 have circular flanges 40 and 41, respectively. The circular flanges straddle the opening in the tray. A slight vertical clearance is provided between the flanges and the thickness of the tray, and the lower portion of each carrier has slight transverse clearance relative to the opening in the tray, as shown more clearly in FIG. 4. As a result, the carriers are precluded from a substantially vertical movement relative to the tray, but have a limited free-floating lateral movement in the plane of the tray.

Since the carriers straddle the tray and are in substantially abutting relationship with each other throughout the length of the continous path formed in the tray, the carriers also serve to preclude a separation of the respective inner and outer portions of the tray. Thus the carriers hold the tray together when the tray is inserted into the feeder or removed therefrom, as will be described herein.

In the preferred embodiment, the upper and lower carrier portions are molded from a suitable plastic material, such as "DELRIN". The lower carrier portion has an annular shoulder 42 for seating the upper carrier portion thereon. These carrier portions are preferably nested and are held together by a slight interference or "snap" fit. The lower carrier portion has a through bore 43 formed therein for receiving a component 44 (or other article of manufacture shown in broken lines in FIG. 4). With this arrangement, the upper carrier portion constitutes a retainer for the lower carrier portion; and the lower carrier portion may be readily substituted for, constituting in effect an "adapter", to accommodate different articles of manufacture. The upper carrier portion may be used to hold the article of manufacture if desired. This arrangement provides maximum flexibility and facilitates the convenient use of the feeder for a wide variety of components, pieces, or other articles of manufacture.

Bristles 45 are carried on top of the platen and in the space between the platen and the tray. The bristles are relatively stiff, being made of a suitable material, and are carried on a longitudinal plastic strip 46. These strips (with the bristles thereon) are supplied by 3M Company under the trademark "BRUSHLON"; and, as previously noted, are used in vibratory conveyor systems to directly engage articles of manufacture and propel them in a longitudinal pathway. The strips are glued to longitudinal metal strips 47 which are removably secured to the platen by bolts 48. In this manner, worn strips may be easily replaced. The bristle strips are in registry with the respective portions of the opening in the tray; and the bristles engage the bottom surface of the carriers, and more particularly the flange of the lower carrier portion, as shown more clearly in FIG. 5. Bristle strips 45A are substantially parallel to each other and to the parallel portions 34 of the opening in the tray, while bristle strip 45B is substantially at right angles to the parallel bristle strips 45A and is arranged at one end thereof in registry with a pathway opening 34 A, as shown more clearly in FIG. 1. Pathway opening 34A communicates with the respective openings 34 at each end of the tray.

With reference again to FIGS. 1, 3, and 5, the bristles are tilted or oriented away from the vertical and in the direction of desired travel of the carriers through the serpentine path in the tray. Since the path periodically doubles back upon itself, so as to provide a substantially maximum path length for a substantially minimum plan area of the tray (and hence minimum floor space occupied by the feeder) the orientation of adjacent bristle strips is reversed, so that the bristles always point in the direction of travel of the carriers through the continuous path in the tray. The arrangement of the strips of bristles creates a feeding force in virtually every direction relative to the tray. While the feeding force exerted by the vibrating platen on the carriers by reason of the spring system (previously described) is substantially towards the center of the platen, the arrangement of the alternate bristle strips convert the feeding force in the direction of desired movement of the carriers through the path in the tray.

Figure 6A:
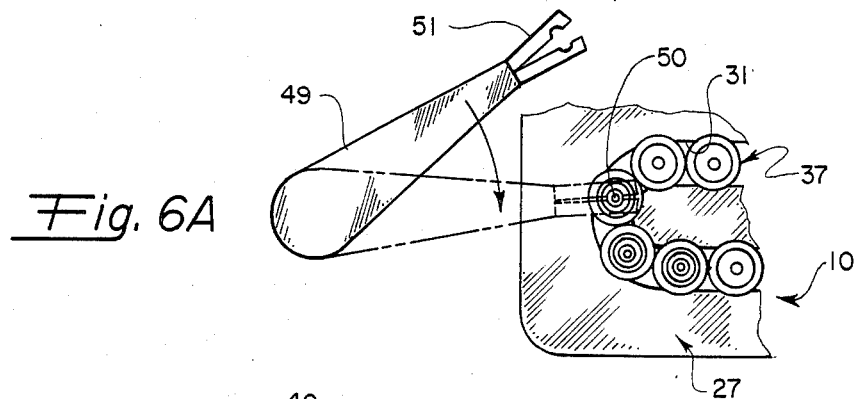
FIGS. 6A-6E are schematic sequence views showing the manner in which a robotic transfer arm cooperates with the vibratory feeder for continually removing (or loading) the articles of manufacture, in sequence, from the respective carriers on the tray.
Figure 6B:
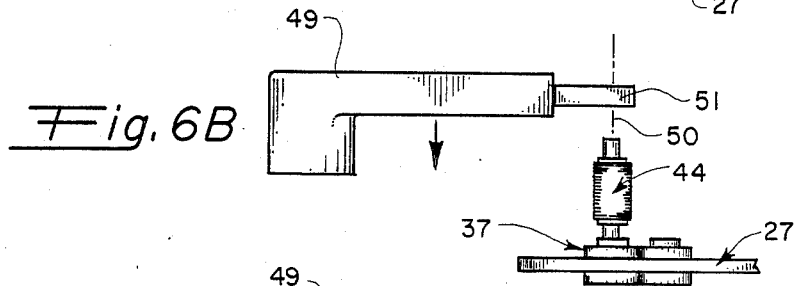
Figure 6C:
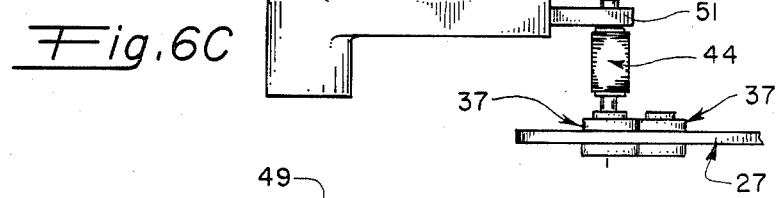
Figure 6D:
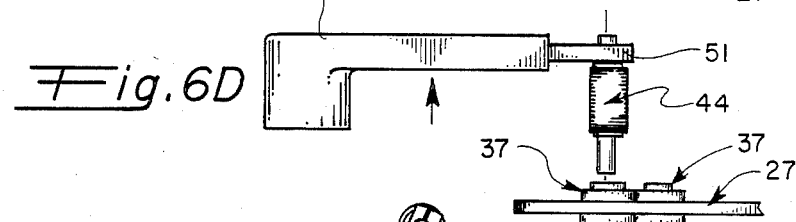
Figure 6E:
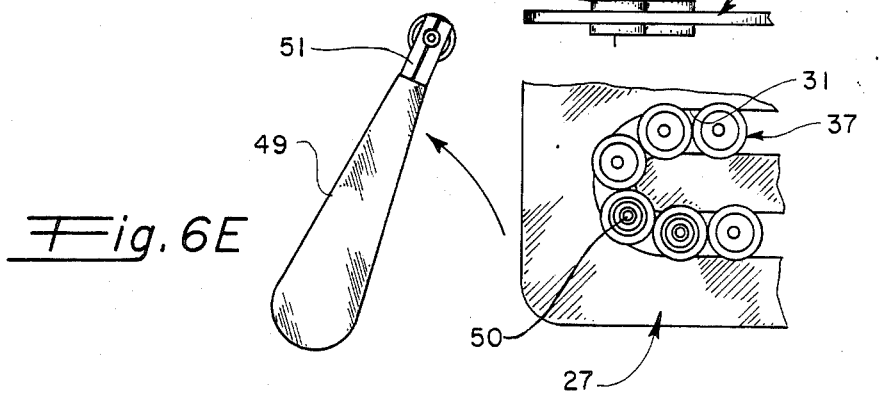

With reference to FIGS. 6A–6E, an indexable robotic transfer arm 49 is shown schematically. This transfer arm oscillates through an angle about a fixed pivot point and, in a timed sequence, indexes vertically. In the schematic plan layout of FIG. 6A, the arm swings from its first position to a second position as illustrated by the broken lines. In this second position, as shown in the schematic elevational view of FIG. 6B, the end of the arm is directly over a predetermined pick-up point, denoted generally as at 50. The arm then indexes downwardly to the position shown in FIG. 6C, and gripping fingers 51 on the end of the arm engage the component 44 or other article of manufacture. The arm then indexes upwardly to the position shown in FIG. 6D, and thereafter, the arm then swings away from the tray to its initial position as shown in FIG. 6E. The gripping fingers open to release the article or position it within a suitable machine tool or other apparatus (not shown) and the cycle is repeated. It will also be appreciated that a reverse cycle may be used, that is, an empty tray may be inserted into the feeder and the articles loaded thereon.

With this arrangement, the robotic transfer arm has a relatively simple movement and, of special significance, always unloads the articles from a fixed or predetermined point on the tray. This constitutes a single matrix interface. Preferably but not necessarily, the predetermined pick-off point is at one of the corners of the tray. The necessity for an expensive electronically-controlled robotic arm, one that senses the ever changing X-Y coordinates on a horizontal tray, is completely obviated. The single matrix interface, rather than a 100-point matrix (for example), is a decided advantage. Thus the feeder of the present invention facilitates automation simplification and results in improved reliability at substantial cost savings.

Figure 7A:
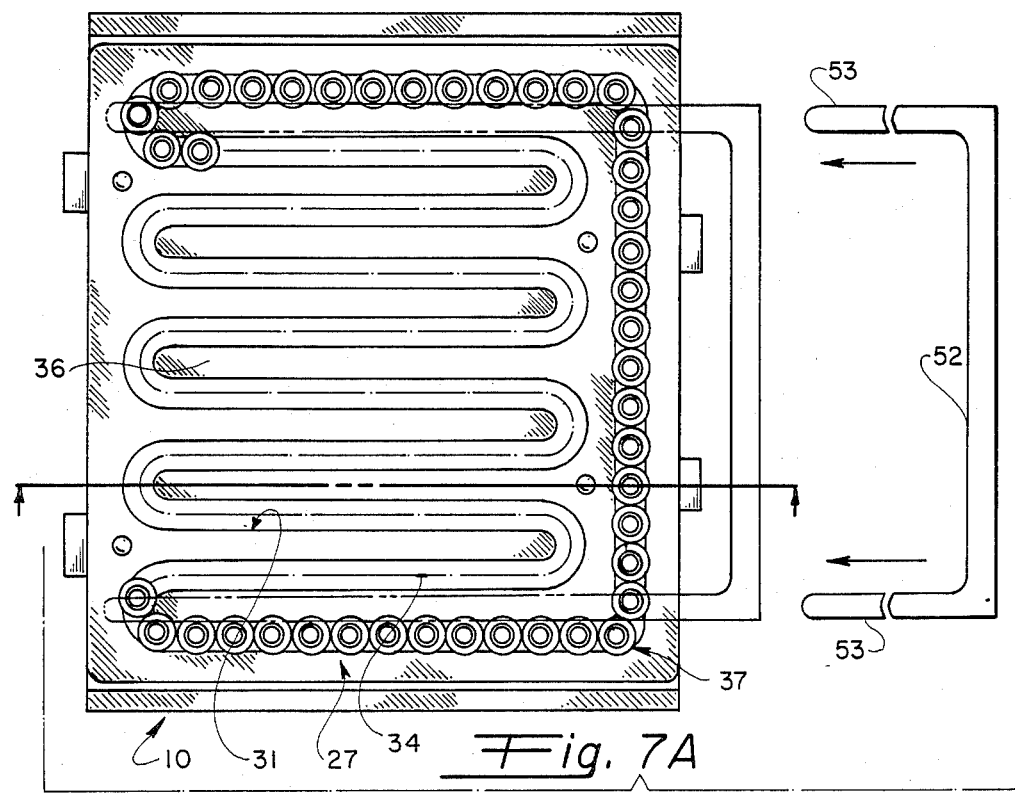
FIGS. 7A-7E are further schematic sequence views showing the manner which an "unloaded" tray is removed from the feeder and a new "loaded" tray is placed in the feeder.
Figure 7B:
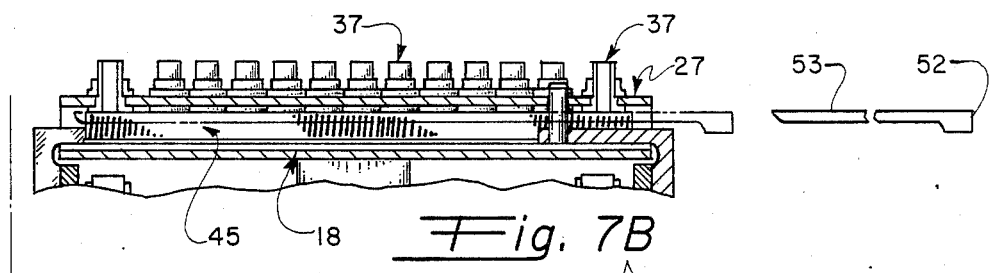
Figure 7C:
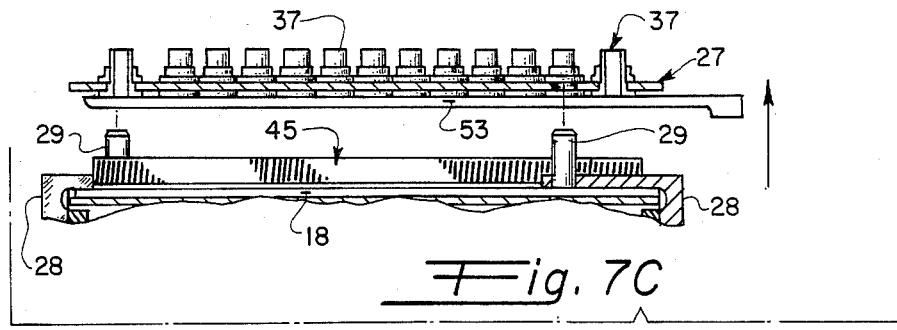
Figure 7D:
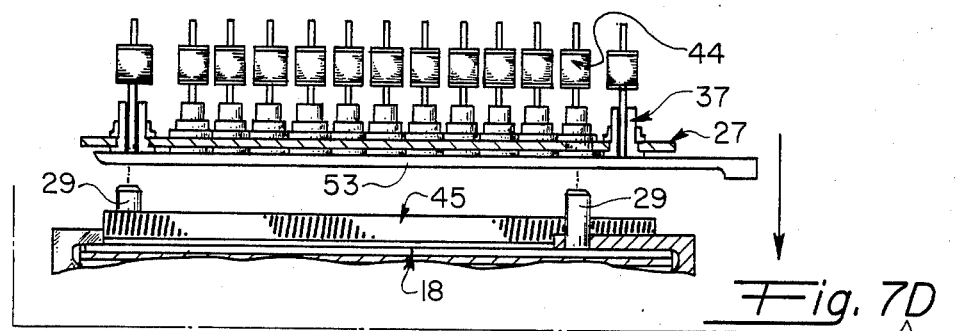
Figure 7E:
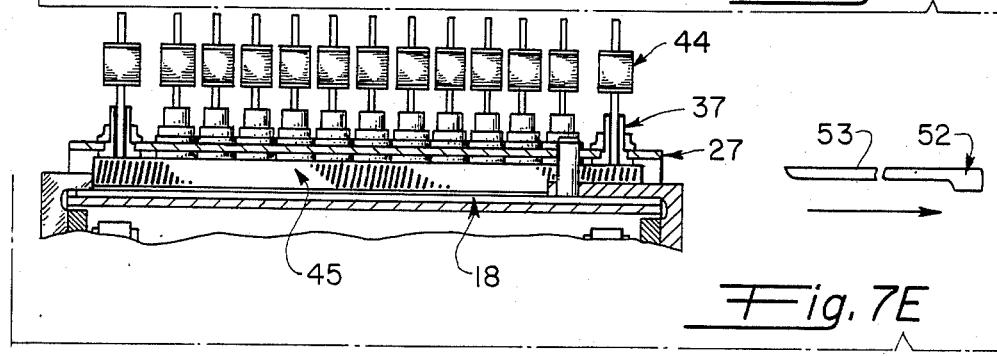

With reference to the schematic sequence views of FIGS. 7A–7E, the manner in which the loaded trays are received in the feeder, and the unloaded trays are removed from the feeder, may be more readily appreciated. In FIG. 7A, which is a schematic plan layout, a bifurcated reciprocatory member 52 having a pair of parallel forks or prongs 53 is moved towards the feeder. This occurs after all of the articles have been removed from the tray by the robotic arm. The prongs on the reciprocatory member are received between the tray and the platen (outside of the bristle strips) as shown by the broken lines in schematic elevational view of FIG. 7B. Thereafter, as shown in FIG. 7C, the member is lifted so that the prongs raise the tray vertically, away from the platen, and off of the alinement pins on the frame of the feeder. The unloaded tray may be removed from the prongs or stacked in a suitable tray stacker (not shown) and a new tray, pre-loaded with the articles of manufacture, is received by the prongs as shown in FIG. 7D. Thereafter, the new tray is lowered on to the feeder as shown in FIG. 7E. Alternately, the prongs on the reciprocating member may be used to take off unloaded trays from the feeder, and a different mechanism (not shown) may be used to replace a new, loaded tray on to the feeder from the opposite side thereof.

Figure 8:
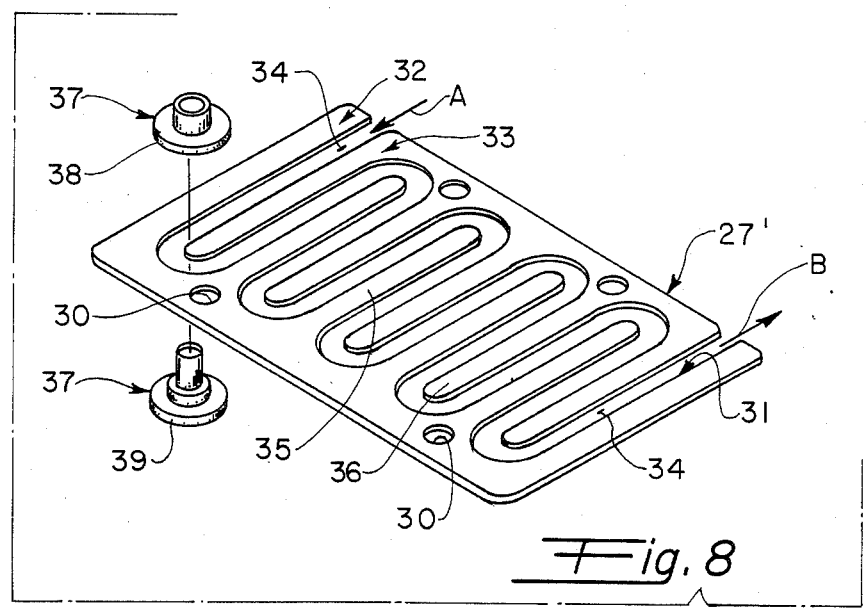
FIG. 8 is an alternate embodiment of the tray shown in FIG. 1.

With reference to FIG. 8, there is disclosed an alternate embodiment 27' of the tray. This tray 27' is not closed (as the tray 27 in FIG. 1) but is open so that the carriers on which the articles are mounted pass through the tray. The carriers enter the tray as indicated by the arrow A and exit as indicated by arrow B.

A suitable queuing device 54 is shown in FIG. 9. This device has a reciprocatory member 55 mounted on guide rods 56 and actuated by an air cylinder 57 or other suitable means. The forward portion or face of the member has a concave surface 58 which engages the respective carrier and steadies it against a concave niche 59 (formed in one of the fingers of the respective tray portions) for removal of the article therefrom by the robotic arm. The operations of the queuing device and the robotic arm, like the means for loading and unloading the trays from the feeder, are in timed sequence relative to one another. However, the means for achieving this timed relationship, being conventional, has been omitted for ease of illustration. The queuing device may straddle the tray (in the preferred embodiment) or may be located inside of the frame, if desired.

The feeding device of the present invention may interface with a programmable machine capable of performing selected operations, and the tray may constitute a transport device between these operations. The articles removably mounted on the carriers in the tray may be all identical or, if desired, could be in batches. Conceivably, a "batch" of just one part is feasible. Moreover, one of the carriers (or "pucks") could be made of metal so as to cooperate with sensing means for identification purposes, thereby triggering a desired machine sequence or conveyorized operation.

Obviously, many modifications may be made without departing from the basic spirit of the present invention. Accordingly, within the scope of the appended claims, the invention may be practiced other than specifically disclosed herein.

What is claimed is:

1. A vibratory feeder for articles of manufacture, comprising a frame, a platen, means for resiliently mounting the platen on the frame, a tray removably mounted on the frame above the platen and spaced therefrom, means for aligning the tray on the frame relative to the platen, the tray having a path therein, the path having a plurality of respective portions substantially parallel to one another and including first and second sets of path portions meshing with respect to one another, thereby substantially maximizing the length of the path while substantially minimizing the size of the tray, a plurality of carriers mounted in the path and having respective bottom portions extending below the tray, means for restraining the carriers against substantial vertical movement but accommodating limited free-floating lateral movement in the plane of the tray, means for mounting the articles on the respective carriers, respective strips of bristles carried on the platen, arranged below the path in the tray, and engaging the respective bottom portions of the carriers for moving the carriers in the direction of their desired travel through the path in the tray, the bristles on each strip being tilted away from the vertical and in the direction of desired travel of the carriers through the gate in the tray, such that the bristles on alternate strips for the respective first and second sets of path portions are tilted oppositely to one another, means for vibrating the platen, the resilient mounting means for the platen including at least one pair of springs having respective upper and lower ends, means for mounting the respective upper ends of the springs to the platen, and means for mounting the respective lower ends of the springs to the frame inwardly of the respective upper ends of the springs, such that the distance between the respective lower ends is less than the distance between the respective upper ends of the springs, whereby the platen is vibrated along an arc which is slightly convex relative to the tray, whereby the feeding force is always directed substantially towards the center of the platen, and whereby the alternate bristles convert the feeding force in the direction of desired movement of the carriers through the path in the tray.

2. A vibratory feeder for articles of manufacture, comprising a frame, a platen, means for resiliently mounting the platen on the frame, a tray removably mounted on the frame above the platen and spaced therefrom, means for aligning the tray on the frame, the tray having a continuous through opening formed therein and defining a substantially serpentine path through the tray, the path including a plurality of respective inner and outer portions substantially parallel to one another, the path further including a pathway arranged substantially at right angles to the parallel portions of the path and communicating with the parallel portions at respective ends of the tray, whereby the length of the path is substantially maximized while the size of the tray is substantially minimized, and whereby the tray is separated into an outer portion and an inner portion meshing with respect to each other, a plurality of carriers mounted in the path, the carriers being in substantial abutting relationship to one another substantially throughout the length of the path in the tray, means for restraining the carriers against substantial vertical movement but accommodating a limited free-floating lateral movement in the plane of the tray, said last-named means including flange means on the carriers and cooperating with the respective inner and outer portions of the tray to prevent said respective inner and outer tray portions from separating from one another, means for mounting the articles on the respective carriers, means for vibrating the platen substantially in the plane thereof and about a slight arc which is convex with respect to the tray, and bristle means carried on the platen and in registry with the opening in the tray and engaging the bottom of the carriers throughout the path, the bristle means being oriented away from the vertical and in the direction of desired travel of the carriers through the path in the tray.

3. The vibratory feeder of claim 2, wherein the frame is substantially box-like and includes a pair of parallel side walls and further includes a bottom wall supported by resilient feet.

4. The vibratory feeder of claim 3, wherein the means for resiliently mounting the platen on the frame comprises two pairs of springs within the frame adjacent to respective side walls of the frame, each of the pair of springs having respective upper and lower ends, means including an upper spring block for mounting the respective upper end of each spring to the platen, and means including a lower spring block for mounting the respective lower ends of the springs to the frame inwardly of the respective upper ends of the springs, such that the distance between the respective lower ends is less than the distance between the respective upper ends of the springs, whereby the platen is vibrated substantially in its plane along an arc which is slightly convex relative to the tray, whereby the forces created by the vibrating plane are directed substantially towards the center of the platen, and whereby the bristle means is tilted to assure that the carriers will travel in a single desired direction through the path in the tray.

5. The vibratory feeder of claim 4, wherein the springs are relatively stiff and substantially flat and are made from a laminated fiberglass epoxy resin sheet material.

6. The vibratory feeder of claim 4, wherein the lower ends of at least some of the respective springs subtends an acute angle with respect to the vertical.

7. The vibratory feeder of claim 6, wherein the acute angle is in the range of from zero to thirty degrees.

8. The vibratory feeder of claim 3, wherein the side walls are connected by parallel cross braces, including two outer braces and an intermediate brace therebetween.

9. The vibratory feeder of claim 8, wherein the means for aligning the tray with respect to the frame comprises brackets carried by the respective outer braces, vertically-oriented alignment pins carried by the respective brackets, and the tray having corresponding holes formed therein to receive the pins.

10. The vibratory feeder of claim 2, wherein the means for vibrating the platen includes a vibratory motor mounted on the underside of the platen.

11. The vibratory feeder of claim 2, wherein each carrier has an upper portion and a lower portion nested with respect to each other and retained by a slight interference fit, and wherein the flange means includes circular flanges on the respective upper and lower carrier portions, the respective flanges being parallel to one another and straddling the thickness of the tray.

12. The vibratory feeder of claim 11, wherein the bristle means engages the bottom surface of the flange on the lower carrier portion.

13. The vibratory feeder of claim 11, wherein the lower carrier portion has an annular shoulder for seating the respective flange on the upper carrier portion.

14. The vibratory feeder of claim 11, wherein the lower carrier portion has a through bore formed therein and extends above the upper carrier portion for receiving a respective article of manufacture.

15. The vibratory feeder of claim 11, wherein the articles of manufacture do not contact one another.

16. The vibratory feeder of claim 11, wherein the articles of manufacture are oriented vertically on the respective carriers.

17. The vibratory feeder of claim 11, wherein the path in the tray is closed.

18. The vibratory feeder of claim 11, wherein the path in the tray is open.

19. The vibratory feeder of claim 11, wherein the bristle means comprises elongated bristle strips including a backing strip for mounting the bristle strips on top of the platen in substantial registry with the respective portions of the through opening formed in the tray.

20. The vibratory feeder of claim 19, wherein the bristles on alternate strips for the parallel portions of the through opening are tilted oppositely of one another, but in the desired direction of travel of the carriers through the path in the tray.

21. The vibratory feeder of claim 2 wherein the tray has a predetermined pick-off point.

22. The vibratory feeder of claim 21, wherein the predetermined pick-off point is substantially at one of the corners of the tray.

23. The vibratory feeder of claim 21, further including a robotic transfer arm provided with gripping fingers for engaging the respective article of manufacture at the predetermined pick-off point on the tray, the arm thereby having a single matrix interface with respect to the tray.

24. The vibratory feeder of claim 23, wherein the arm oscillates through an angle and indexes vertically relative to the tray.

25. The vibratory feeder of claim 21, further including a queuing means at the predetermined pick-off point on the tray and operating in timed sequence with the transfer arm.

26. The vibratory feeder of claim 25, wherein the carrier has at least one circular flange therein, and wherein the queuing means comprises a reciprocating member having a concavely-formed forward face for engaging the circular flange in the carrier.

27. The vibratory feeder of claim 26, wherein the tray includes a finger portion projecting towards the predetermined pick-off point, and wherein the finger has a concave niche formed thereon, substantially diametrically opposite to the concavely-formed forward face on the reciprocating member, for supporting the opposite side of the flange on the carrier.

28. The vibratory feeder of claim 2, further including means for inserting and removing the respective trays in the frame.

29. The vibratory feeder of claim 28, wherein the inserting and removing means comprises a reciprocating bifurcated member having a pair of prongs adapted to be received between the tray and the platen, and means for vertically indexing the member for raising and lowering the respective trays on the frame of the feeder.

30. A vibratory feeder for articles of manufacture, comprising a frame, a platen, means for resiliently mounting the platen on the frame, a tray removably mounted on the frame above the platen and spaced therefrom, means for aligning the tray on the frame, the tray having a continuous through opening formed therein and defining a substantially serpentine path through the tray, the path including a plurality of respective inner and outer portions substantially parallel to one another, the path further including a pathway arranged substantially at right angles to the parallel portions of the path and communicating with the parallel portions at respective ends of the tray, whereby the length of the path is substantially maximized while the size of the tray is substantially minimized, and whereby the tray is separated into an outer portion and an inner portion meshing with respect to each other, a plurality of carriers mounted in the path for supporting articles of manufacture, the carriers being in substantial abutting relationship to one another substantially throughout the length of the path in the tray, means for restraining the carriers against substantial vertical movement but accommodating a limited free-floating lateral movement in the plane of the tray, said last-named means including flange means on the carriers and cooperating with the respective inner and outer portions of the tray to prevent said respective inner and outer tray portions from separating from one another, and vibratory means associated with the platen for advancing the carriers along the path in the tray.

31. A vibratory feeder for articles of manufacture, comprising a frame, a platen, means for resiliently mounting the platen on the frame, a tray removably mounted on the frame above the platen and spaced therefrom, means for aligning the tray on the frame, the tray having a continuous through opening formed therein and defining a substantially serpentine path through the tray, the path including a plurality of respective inner and outer portions substantially parallel to one another, the path further including a pathway arranged substantially at right angles to the parallel portions of the path and communicating with the parallel portions at respective ends of the tray, whereby the length of the path is substantially maximized while the size of the tray is substantially minimized, and whereby the tray is separated into an outer portion having a plurality of separate fingers and an inner portion having a plurality of complementary separate fingers, said complementary fingers meshing with respect to each other, a plurality of carriers mounted in the path for supporting articles of manufacture, the carriers being in substantial abutting relationship to one another substantially throughout the length of the path in the tray, means for restraining the carriers against substantial vertical movement but accommodating a limited free-floating lateral movement in the plane of the tray, said last-named means including flange means on the carriers and cooperating with the fingers of respective inner and outer portions of the tray to prevent said respective inner and outer tray portions from separating from one another, and vibratory means associated with the platen for advancing the carriers along the path in the tray.

* * * * *